Oct. 9, 1951 E. WERNER 2,570,618
NUT AND PLATE TEMPORARY FASTENER
Filed July 2, 1949

INVENTOR.
EDWARD WERNER
BY *William R. Lane*
ATTORNEY

Patented Oct. 9, 1951

2,570,618

UNITED STATES PATENT OFFICE 2,570,618

NUT AND PLATE TEMPORARY FASTENER

Edward Werner, Los Angeles, Calif., assignor to North American Aviation, Inc.

Application July 2, 1949, Serial No. 102,826

1 Claim. (Cl. 85—5)

The present invention relates to fastening devices and particularly to fastening units intended for temporarily positioning plate nuts and like elements during installation.

It is an object of the present invention to provide means for engaging a plate nut element and retaining it with relation to a bolt hole in a structure.

It is a further object of the present invention to provide a fastening unit having means for engaging threads of a plate nut whereby such an element may be retained in a positive manner for the purpose of drawing the threaded unit into tight contact with the surface upon which it is being installed.

It is also an object of the present invention to provide means for accomplishing the foregoing operations in a positive and reliable manner by means of a unit which may be quickly and expeditiously employed, which is positive in action, readily disengageable, simple in construction, and generally satisfactory from the standpoint of shop operations.

Other objects of invention will become apparent from the following description taken in connection with the accompanying drawings, in which Fig. 1 is an elevational view of the present invention shown in use;

Figure 1:
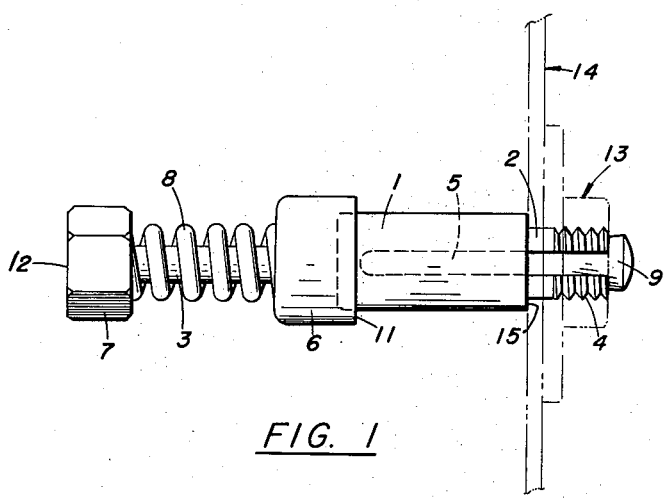
Figure 2:
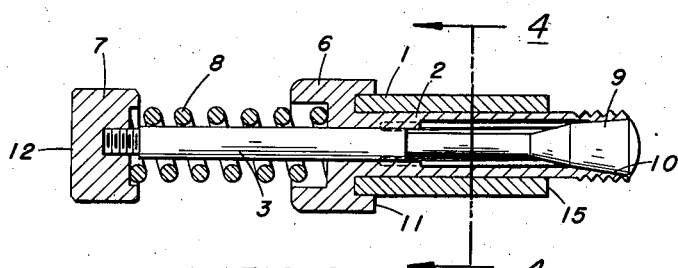
Fig. 2 is a longitudinal section illustrating the construction of the subject unit.
Figure 3:
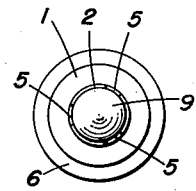
Fig. 3 is an end view.
Figure 4:
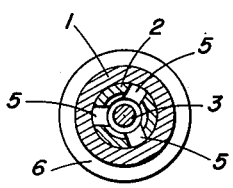
Fig. 4 is a transverse section taken on the line 4—4 of Fig. 2.

The subject device comprises a tool for temporarily positioning a plate nut with respect to a bolt hole preparatory to attaching the plate nut during a fabrication procedure. Plate nuts of a variety of types may be used and these are commonly secured by means of rivets or by spot welding to provide a self-retaining nut installation. The present tool serves as a positioning means in lieu of a bolt or screw inserted through the hole provided in the structure and threaded into the nut during drilling, countersinking, riveting, or spot welding operations. A very positive, firm retaining action is required in order that the desired positioning may be obtained and held precisely until the permanent attachment of the nut element has been completed.

Referring to the drawings, the subject device comprises a tubular body 1 within which is positioned a collet member 2 counterbored longitudinally to receive a mandrel 3. The collet is threaded at the outer end at 4, and is slotted longitudinally at 5 forming a plurality of fingers. The collet is enclosed within the tubular member 1 which forms the outer case and which is seated in a recess provided in the base portion 6 of the collet member 2. The central mandrel 3 extends through the base portion 6, being slidably mounted therein, and has secured to the extending end portion an adjustable retaining or abutment member 7. A coiled spring 8 is positioned about the shaft of the mandrel and maintained in compression between the members 6 and 7. The mandrel 3 is also provided with an enlarged portion 9 having a tapered surface adjacent the opposite end thereof where it lies within the split threaded terminal portion 4 of the collet. The inner surfaces of the fingers formed by the split outer portion 4 of the collet 2 are provided with correspondingly tapered inner surfaces 10 for engagement with the tip portion 9 of the mandrel.

The unit is operated with an appropriate tool which engages the annular surface 11 of the portion 6 and the outer surface 12 of the cap member 7 whereby the spring 8 may be compressed. This action results in the extending of the tapered forward portion 9 of the mandrel beyond the threaded portion of the collet. The split portions of the collet tend to spring inwardly and as the mandrel is extended these members collapse inwardly, resulting in a reduction in the diameter of the threaded tip portion 4. In this position the threaded portion of the collet may be readily inserted within the body of the nut and upon release of the collapsing pressure the spring 8 will retract the mandrel within the collet, expanding this member to bring the outer threaded portions into tight engagement with the threads of the nut. The nut 13 will be drawn tightly into engagement with the adjacent surface of a member 14 (indicated in phantom in Fig. 1), the forward shoulder 15 of the body member 1 of the unit engaging the opposite surface of member 14. Upon completion of the required installation operations, when the nut is secured, the fastener unit is disengaged by recompressing the spring, with the tool, whereby the threaded portion of the collet may be disengaged from the threads of the nut to permit withdrawal.

Although the invention has been described and illustrated in detail, it is to be clearly understood that the same is by way of illustration and example only and is not to be taken by way of limitation, the spirit and scope of this invention being limited only by the terms of the appended claim.

I claim:

A fastener for engaging a threaded article to temporarily secure the same in substantial alignment with a bolt hole in a surface member, comprising a collet having integral therewith and extending therefrom a plurality of normally inwardly sprung fingers, serrations on the outer tip portions of said fingers to engage the threads of said article, a mandrel slidably mounted on said collet and having on one end thereof an inclined surface for engaging the inner side of said tip portions to expand the same outwardly, an abutment on the other end of said mandrel, a spring between said collet and said abutment for urging said inclined surface into engagement with said tip portions to expand said fingers, and a tubular sleeve carried by said collet and partially encompassing said fingers to limit the outward movement thereof, said sleeve having a shoulder abutting said surface member when the unencompassed portions of said fingers extend through said hole and said serrations engage said threaded article.

EDWARD WERNER.

REFERENCES CITED

The following references are of record in the file of this patent:

UNITED STATES PATENTS

| Number | Name | Date |
| --- | --- | --- |
| 2,267,328 | Finkle | Dec. 23, 1941 |
| 2,320,435 | Hood | June 1, 1943 |
| 2,340,428 | Ramsdell | Feb. 1, 1944 |
| 2,393,587 | Bugg | Jan. 29, 1946 |

FOREIGN PATENTS

| Number | Country | Date |
| --- | --- | --- |
| 348,974 | Italy | June 4, 1937 |
| 502,374 | Great Britain | Nov. 14, 1938 |